(12) United States Patent
Zhao et al.

(10) Patent No.: US 12,460,834 B2
(45) Date of Patent: Nov. 4, 2025

(54) CONSTANT TEMPERATURE SYSTEMS

(71) Applicant: COCLEAN Technologies, Co., Ltd., Beijing (CN)

(72) Inventors: Fei Zhao, Beijing (CN); Ye Zhao, Beijing (CN); Hongyu Li, Beijing (CN); Kai Qi, Beijing (CN)

(73) Assignee: COCLEAN Technologies, Co., Ltd., Beijing (CN)

( * ) Notice: Subject to any disclaimer, the term of this patent is extended or adjusted under 35 U.S.C. 154(b) by 437 days.

(21) Appl. No.: 17/977,004

(22) Filed: Oct. 31, 2022

(65) Prior Publication Data

US 2024/0053039 A1    Feb. 15, 2024

(30) Foreign Application Priority Data

Aug. 12, 2022   (CN) .......................... 202210970504.0

(51) Int. Cl.
*F24F 11/49*   (2018.01)
*F24F 11/52*   (2018.01)
(Continued)

(52) U.S. Cl.
CPC .............. *F24F 11/49* (2018.01); *F24F 11/52* (2018.01); *F24F 11/65* (2018.01); *F24F 11/88* (2018.01); *F24F 2110/10* (2018.01)

(58) Field of Classification Search
CPC .. F24F 11/49; F24F 11/52; F24F 11/65; F24F 11/88; F24F 11/89
See application file for complete search history.

(56) References Cited

U.S. PATENT DOCUMENTS

2012/0125559 A1   5/2012 Fadell et al.
2012/0126020 A1*  5/2012 Filson ..................... H04W 4/70
                                                              236/1 C
(Continued)

FOREIGN PATENT DOCUMENTS

CA    2851367 C    3/2020
CN    106054957 A1  10/2016
CN    107065961 A1   8/2017

OTHER PUBLICATIONS

State Intellectual Property Office of the People's Republic of China, Office Action and Search Report Issued in Application No. 2022109705040, Jun. 10, 2025, 15 pages. (Submitted with Machine Translation).

*Primary Examiner* — Ziaul Karim
*Assistant Examiner* — Vincent W Chang
(74) *Attorney, Agent, or Firm* — Christopher R. Carroll; The Small Patent Law Group LLC

(57) ABSTRACT

A constant temperature system is provided, including: a HVAC system; a first thermostat configured to control the HVAC system; a second thermostat for replacing the first thermostat; an application in a terminal device for guiding installation of the second thermostat. The terminal device includes a display screen. The application is configured to: obtain a first wiring connection mode, determine a system configuration of the HVAC system, determine a type of an energy source for driving the HVAC system to operate, obtain a second wiring connection mode according to the first wiring connection mode, instruct a user to replace the thermostat according to the second wiring connection mode; obtain control logic matching the system configuration and the type of the energy source to enable the second thermostat to control the HVAC system when the second thermostat and the HVAC system are connected in the second wiring connection mode.

16 Claims, 10 Drawing Sheets

(51) Int. Cl.
*F24F 11/65* (2018.01)
*F24F 11/88* (2018.01)
*F24F 110/10* (2018.01)

(56) References Cited

U.S. PATENT DOCUMENTS

| | | | |
|---|---|---|---|
| 2012/0130679 A1* | 5/2012 | Fadell | B01D 46/0086 702/183 |
| 2012/0248210 A1* | 10/2012 | Warren | F24F 11/52 236/1 C |
| 2013/0204440 A1 | 8/2013 | Fadell et al. | |
| 2014/0091153 A1* | 4/2014 | Stefanski | G06F 3/0482 236/1 C |
| 2018/0283716 A1* | 10/2018 | Ribbich | G05B 15/02 |
| 2022/0252292 A1* | 8/2022 | Vie | F24F 11/58 |

* cited by examiner

What does Y2 control? This will determine how to manage your HVAC system

Heat pump

Chiller

Other

HVAC system

What type of fuel is used?

Electricity

Gas

Oil

Propane

I don't know

CONSTANT TEMPERATURE SYSTEMS

CROSS REFERENCE TO RELATED APPLICATIONS

This application claims priority to Chinese Patent Application No. 2022109705040 filed on, Aug. 12, 2022, the entire content of which is incorporated herein by reference.

TECHNICAL FIELD

The present disclosure relates to a technical field of electric control, and in particular, to constant temperature systems.

BACKGROUND

In everyday life, in a heating, ventilation and air conditioning (HVAC) system, it is usually necessary to replace the original control equipment connected to the HVAC system with a new control equipment (such as a thermostat). The control equipment and the HVAC system are generally connected through wires, when replacing the control device, wires connected to the original control device need to be reconnected to the new control device.

Generally, multiple connection terminals are provided on the control device. After connecting the wires of the HVAC system to the corresponding connection terminals of the control device, the HVAC system can be controlled through the control device. However, since most users are not aware of the corresponding relationship between the wires and the connection terminals, users usually cannot install the thermostat by themselves, therefore professional on-site service or remote assistance is required for users to install the thermostat, which brings inconveniences and a higher cost for users to replace the thermostat.

SUMMARY

In order to overcome the problems existing in the related art, the present disclosure provides a constant temperature system.

The present disclosure provides a constant temperature system comprising: a heating, ventilation and air conditioning (HVAC) system; a first thermostat configured to control the HVAC system; a second thermostat for replacing the first thermostat; an application program on a terminal device for guiding installation of the second thermostat, wherein the terminal device includes a display screen, and the application program is configured to: obtain a first wiring connection mode between the HVAC system and the first thermostat, and determine a system configuration of the HVAC system according to the first wiring connection mode; determine the second wiring connection mode between the second thermostat and the HVAC system according to the system configuration, and output the second wiring connection mode on the display screen; determine a type of an energy source for driving the HVAC system to operate; obtain control logic matching the system configuration and the type of the energy source to enable the second thermostat to control the HVAC system according to the control logic, where the second thermostat and the HVAC system are connected in the second wiring connection mode.

According to a second aspect of the present disclosure, there is provided a device, applied to a constant temperature system including: a heating, ventilation and air conditioning (HVAC) system; a first thermostat configured to control the HVAC system; a second thermostat for replacing the first thermostat; the device comprises: a storage medium storing processor executable instructions; a processor configured to execute the processor executable instructions; a display screen; when executing the processor executable instructions, the processor performs following operations: obtaining a first wiring connection mode between the HVAC system and the first thermostat, and determining a system configuration of the HVAC system according to the first wiring connection mode; determining a second wiring connection mode between the second thermostat and the HVAC system according to the system configuration, and outputting the second wiring connection mode on the display screen; determining a type of an energy source for driving the HVAC system to operate; obtaining control logic matching the system configuration and the type of the energy source to enable the second thermostat to control the HVAC system according to the control logic, where the second thermostat and the HVAC system are connected in the second wiring connection mode.

According to a third aspect of the present disclosure, there is provided a non-transitory storage medium having processor executable instructions stored thereon and applied to a constant temperature system, wherein the constant temperature system includes: a heating, ventilation and air conditioning (HVAC) system; a first thermostat; and a second thermostat for replacing the first thermostat; when executing the processor executable instructions, the processor performs following operations: obtaining a first wiring connection mode between the HVAC system and the first thermostat, and determining a system configuration of the HVAC system according to the first wiring connection mode; determining a second wiring connection mode between the second thermostat and the HVAC system according to the system configuration, and outputting the second wiring connection mode; determining a type of an energy source for driving the HVAC system to operate; obtaining control logic matching the system configuration and the type of the energy source to enable the second thermostat to control the HVAC system according to the control logic, where the second thermostat and the HVAC system are connected in the second wiring connection mode.

The technical scheme provided by the present disclosure can include following beneficial effects:

For constant temperature system provided by one or more embodiments of the present disclosure, by acquiring the first wiring connection mode between the HVAC system and the first thermostat, the system configuration of the HVAC system is determined, the type of the energy source for driving the HVAC system to operate is determined, the second wiring connection mode between the thermostat and the HVAC system is obtained according to the first wiring connection mode, and the user is instructed to connect the thermostat and the HVAC system according to the second wiring connection mode; then the control logic that matches the system configuration and the type of the energy source is obtained, to enable the thermostat to control the HVAC system in accordance with the control logic when the thermostat is connected to the HVAC system in the second wiring connection mode. Therefore, the HVAC system can be controlled by the thermostat. In this way, the labour cost of replacing the thermostat is reduced.

It should be understood that the foregoing general description and the following detailed description are exemplary and explanatory only and are not restrictive of the present disclosure.

BRIEF DESCRIPTION OF DRAWINGS

Accompanying drawings herein are incorporated into and constitute a part of the specification, illustrate embodiments consistent with the present disclosure, and are combined with the description to explain the technical solutions of the present disclosure.

DETAILED DESCRIPTION

Figure 1A:
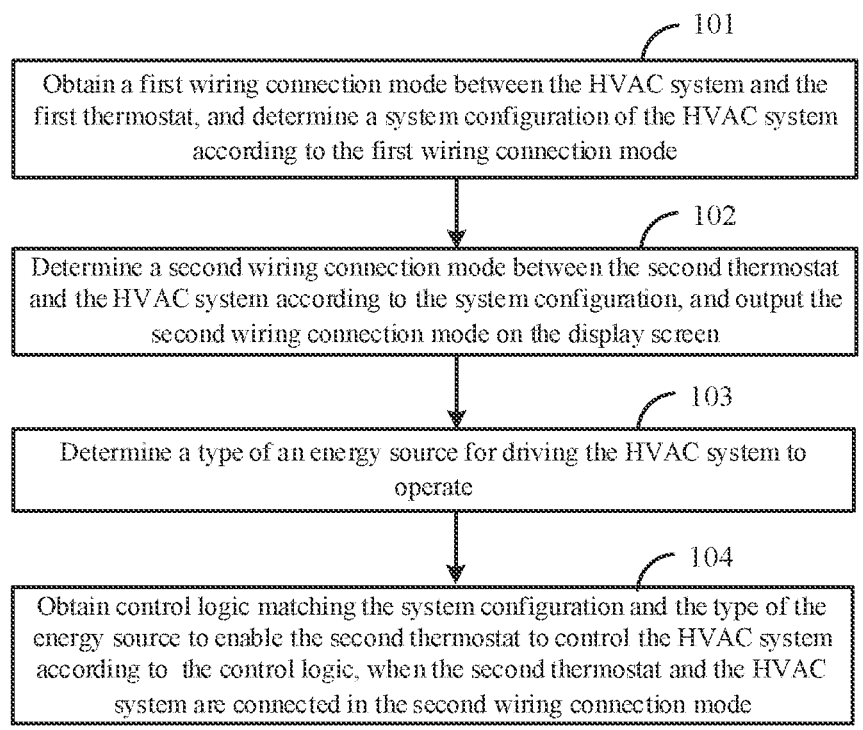
FIG. 1A is a flow diagram for a configuration of an application program in a constant temperature system according to an exemplary embodiment of the present disclosure.

Exemplary embodiments will be described in detail herein, examples of which are illustrated in the accompanying drawings. Where the following description refers to the drawings, the same numerals in different drawings refer to the same or similar elements unless otherwise indicated. The implementations described in the illustrative examples below are not intended to represent all implementations consistent with this specification. Rather, they are merely examples of apparatus and methods consistent with some aspects of this specification as recited in the appended claims.

The terms used in this specification are only for the purpose of describing particular embodiments and are not intended to limit the specification. As used in this specification and the appended claims, the singular forms "a", "said" and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in this specification to describe various information, such information should not be limited to these terms. These terms are only used to distinguish the same type of information from each other. For example, without departing from the scope of the present specification, the first information may also be referred to as the second information, and similarly, the second information may also be referred to as the first information. Depending on the context, the word "if" as used herein can be interpreted as "at the time of", "when" or "in response to determining".

In general, an HVAC system has multiple wires for connecting to corresponding multiple connection terminals of a thermostat. Each of the connection terminals corresponds to an identifier, which can be used to identify one or more functions corresponding to the wire connected to this connection terminal. For example, if an identifier corresponding to a connection terminal is O/B, it can be understood that the wire connected to O/B connection terminal can be used to control a direction of a heat pump; for another example, an identifier corresponding to a connection terminal is Y1, it can be understood that a wire connected to Y1 connection terminal can be used to start the heat pump. In some embodiments, identifiers of connection terminals may include W2/AUX, C, E, G, O/B, Rh, Rc, W1, W3, Y1, Y2, etc. Generally, a connection terminal on the thermostat is connected to a wire for the corresponding function in the HVAC system. Therefore, an identifier of a connection terminal can be understood as an identifier of a wire. For example, an identifier of a connection terminal is O/B, and a wire inserted into the connection terminal is called O/B wire.

However, when most users face with multiple wires that need to be connected to a thermostat in the HVAC system, they do not know which wire of the HVAC system should be inserted in to which connection terminal of the thermostat. Therefore, professional on-site service or remote assistance is required for users to install the thermostat, which increases the cost for the user to replace the thermostat.

Therefore, the present disclosure provides a constant temperature system including an HVAC system, a first thermostat for controlling the HVAC system, a second thermostat for replacing the first thermostat, and an application program on a terminal device for guiding installation of the second thermostat, the terminal device includes a display. The terminal device may be a smart phone. In this constant temperature system, a user can replace the first thermostat with the second thermostat by himself/herself. In addition to heating and air conditioning, HVAC systems in the present disclosure may provide other functions such as emergency heating or functioning as a humidifier, a dehumidifier, a fan, and the like.

Following embodiments will describe, in detail, with reference to the accompanying drawings, a configuration of the application program in the constant temperature system provided by the present disclosure.

FIG. 1A is a flow diagram for a configuration of an application program in a constant temperature system according to an exemplary embodiment of the present disclosure. As shown in FIG. 1A, the application program in the constant temperature system is configured to execute following steps 101 to 104.

In step 101, a first wiring connection mode for the HVAC system and the first thermostat is obtained, and a system configuration of the HVAC system is determined according to the first wiring connection mode.

In the present disclosure, a wiring connection mode for the HVAC system and the first thermostat can be obtained in various ways, which will be described in detail in subsequent embodiments. To distinguishing a wiring connection mode for the HVAC system and the first thermostat and a wiring connection mode for the HVAC system and the second thermostat, the wiring connection mode for the HVAC system and the first thermostat is referred to as a first wiring connection mode.

At least a part of the HVAC system configuration can be determined by the first wiring connection mode, e.g., if the HVAC system and the O/B connection terminal are connected in the first wiring connection mode, it can be reliably inferred that the HVAC system uses a heat pump. Therefore, by analyzing the connection between the first thermostat and the wires in the HVAC system in the first wiring connection mode, part or all of the system configuration of the HVAC system can be deduced. But in different HVAC system configurations, a similar wiring connection mode for a thermostat may be used. Therefore, every HVAC system configuration cannot be inferred from wiring connection mode alone. For example, in an HVAC system that does not use a heat pump, the Y1 wire can be used to activate an air conditioner, while in a heat pump system, the Y1 wire can be used, in conjunction with the O/B wire, to activate the heat pump. In a heat pump system, it may not be possible to determine whether the HVAC system is dual fuel system or single fuel system according to the wiring connection mode alone. In these cases, the energy type for driving the HVAC system can be determined according to user's input based on predetermined query questions. The specific method of determining the energy type will be explained in the subsequent explanation of step 103.

In step 102, a second wiring connection mode between the second thermostat and the HVAC system is determined according to the system configuration, and the second wiring connection mode is output on the display screen.

In the case of a known system configuration, the wiring connection mode for the second thermostat and the HVAC system can be determined, which is referred to as the second wiring connection mode for the convenience of distinction. The second wiring connection mode is output on the display screen, so that the user can insert a wire of the HVAC system into a matching connection terminal of the second thermostat according to the second wiring connection mode. For example, the wire originally connected to the C connection terminal of the first thermostat is inserted into the C connection terminal of the second thermostat.

In step 103, the type of energy for driving the HVAC system to operate is determined.

In practice, the HVAC system in each home may be driven by different energy types, depending on climate, geographic location, different time of year, age of the house, available natural resources locally, etc. For example, some homes may use conventional gas heaters and compressor-based air conditioners, others may use heat pumps. Due to the limitations of heat pumps in extreme weather, supplementary systems such as resistance heating, gas heaters, radiant floors, boilers, etc. can be used. Therefore, the type of energy source for the operation of the HVAC system can be determined by the user's response to the predetermined query messages.

In step 104, control logic matching the system configuration and the energy type is obtained to enable the second thermostat to control the HVAC system according to the control logic, in a case of the second thermostat being connected to the HVAC system in the second wiring connection mode.

The control logic matching the system configuration and the energy type is pre-stored, and when the system configuration and the energy type are known, the control logic matching the system configuration and the energy type can be acquired. After obtaining the control logic matching the system configuration and energy type, in a case that the second thermostat is connected to the HVAC system according to the second wiring connection mode, the second thermostat can control the HVAC system according to the control logic.

Through the above steps, the application program can guide the user to replace the first thermostat with the second thermostat to connect with the HVAC system, which reduces the labor cost for replacing the thermostat.

Figure 1B:
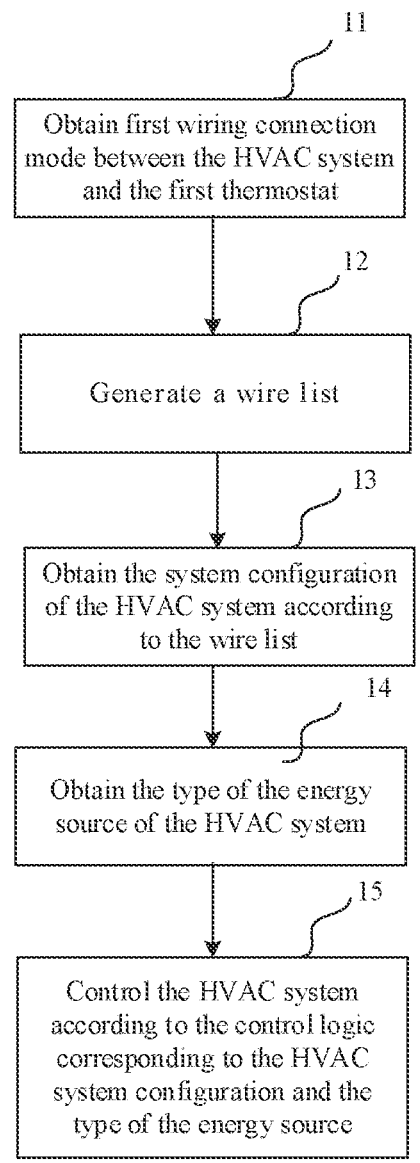
FIG. 1B is a flow diagram of a method of determining a control logic for controlling a HVAC system according to an exemplary embodiment of the present disclosure.

FIG. 1B is a flow diagram of a method of determining a control logic for controlling an HVAC system according to an exemplary embodiment of the present disclosure. As shown in FIG. 1B, the first wiring connection mode (11) between the HVAC system and the first thermostat is obtained, a wire list (12) is generated. According to the wire list, the system configuration of the HVAC system (13) is obtained, and the energy type of the HVAC system (14) is obtained; the HVAC system (15) is controlled according to the control logic corresponding to the HVAC system configuration and the energy type. For example, in the present disclosure, the first wiring connection mode between the HVAC system and the first thermostat can be obtained through the user's response to the first query messages, and then the second wiring connection mode between the second thermostat and the HVAC system can be determined according to the first wiring connection mode between the HVAC system and the first thermostat, instead of determining the second wiring connection mode between the second thermostat and the HVAC system by detecting whether a wire is inserted into the connection terminal of the second thermostat, such that the safety is increased.

In some embodiments, after the second thermostat is wiring connected in the second wiring connection mode, the detection of the hardware voltage and the state of the equipment in the HVAC system can be automatically completed to determine whether the HVAC system is in a normal operating state. In addition, the second thermostat may include a chip for detecting whether a connection terminal of the second thermostat is firmly connected to a wire, and if the second thermostat detects that a connection terminal of the second thermostat is not firmly connected to a wire of the HVAC system, a prompt is issued. In this way, the efficiency to configure the HVAC system and the safety in the configuration process are further improved.

In some embodiments, acquiring the first wiring connection mode between the HVAC system and the first thermostat includes: displaying, on the display screen, at least one predetermined first query message associated with the first wiring connection mode; according to the response to the at least one first query message, determining a first wiring connection mode between the HVAC system and the first thermostat.

According to the basic knowledge in controlling the HVAC system, a plurality of query messages is predetermined in the application program, and there is a specific logical relationship among each query message. In order to distinguish from query messages mentioned later, a query message associated with the first wiring connection mode is referred to as a first query message. A series of first query messages is displayed according to a specific logical relationship, and a first wiring connection mode is determined according to a response to at least one first query message.

Figure 2A:
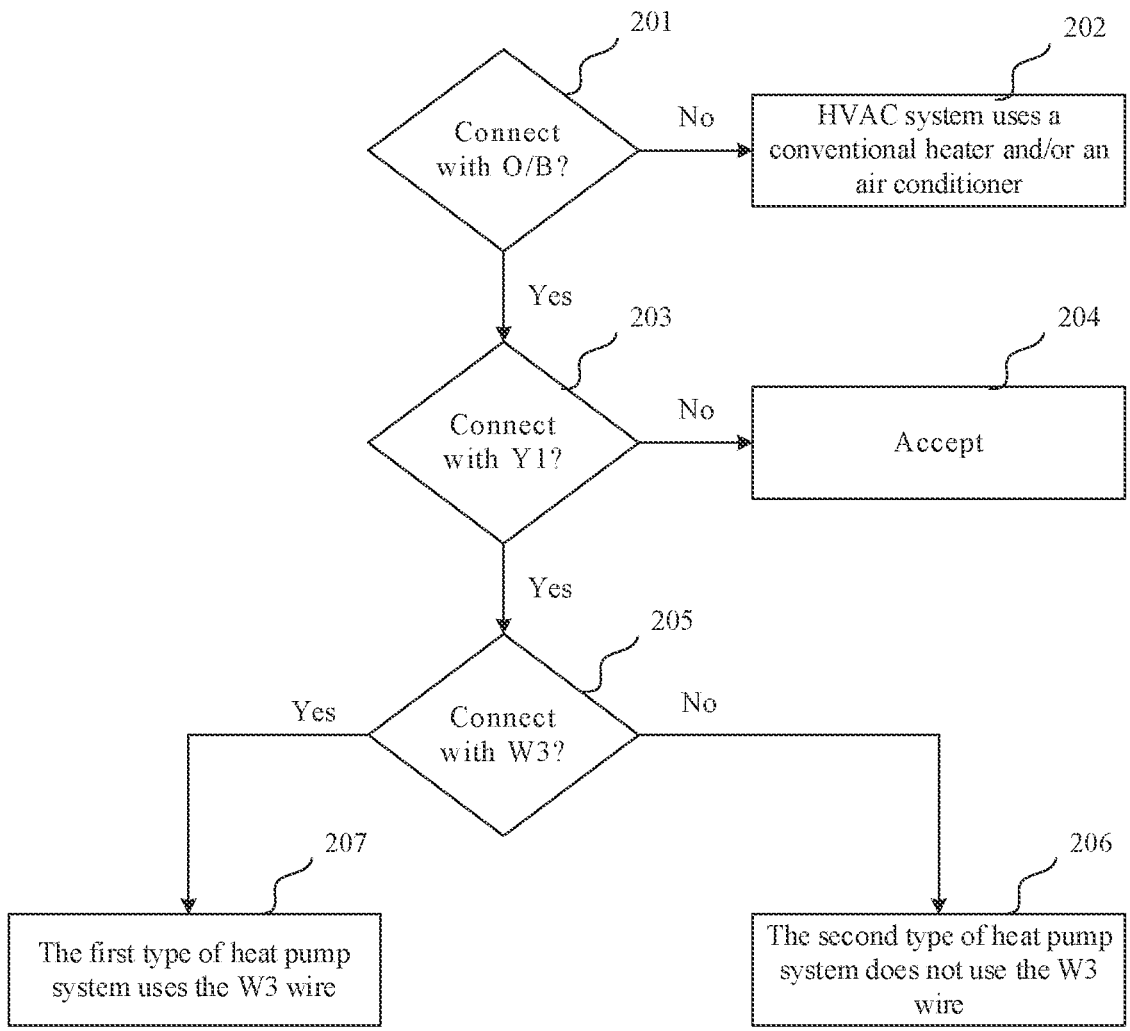
FIG. 2A is a flow diagram of a method of determining whether a HVAC system uses a heat pump by setting first query messages according to an exemplary embodiment of the present disclosure.

For example, FIG. 2A is a flow diagram of a method of determining whether a HVAC system uses a heat pump through setting first query messages according to an exemplary embodiment of the present disclosure. As shown in FIG. 2A, it can first be asked whether the HVAC system is connected to the O/B connection terminal of the first thermostat (201). The O/B wire can be used to control the direction of the heat pump, that is, whether the heat pump is used for heating or cooling. Typically, O/B wire is not used in conventional HVAC systems, which can be understood as that a conventional HVAC system is any HVAC system that does not use a heat pump.

If the response to 201 is "No", it may be determined that the HVAC system uses a conventional heater and/or an air conditioner (202). If the response to 201 is "Yes", then it is asked whether the HVAC system is connected to the Y1 connection terminal of the first thermostat (203). Typically, the Y1 wire is used to start the heat pump. If the response to 203 is "No", an error prompt message is output for prompting the user to double-check the identifier. For example, it can be shown on the display that the Y1 wire is required for the operation of the heat pump. Where, the error prompt message may be the Accept (204) shown in FIG. 2A, and then the first wiring connection mode may be obtained through other methods. If the response to 203 is "Yes", then it is asked whether the HVAC system is connected to the W3 connection terminal of the first thermostat (205). Through steps 201 to 204, it can be determined that the first wiring connection mode includes the O/B wire and the Y1 wire, that is, the second thermostat may be connected to the HVAC system based on the heat pump. In general, many different configurations of heat pump are possible. In this embodiment, a W3 wire can be used to divide the various possible heat pump configurations into two categories, the first type of heat pump system uses the W3 wire (207) and the second type of heat pump system does not use the W3 wire (206).

Figure 2B:
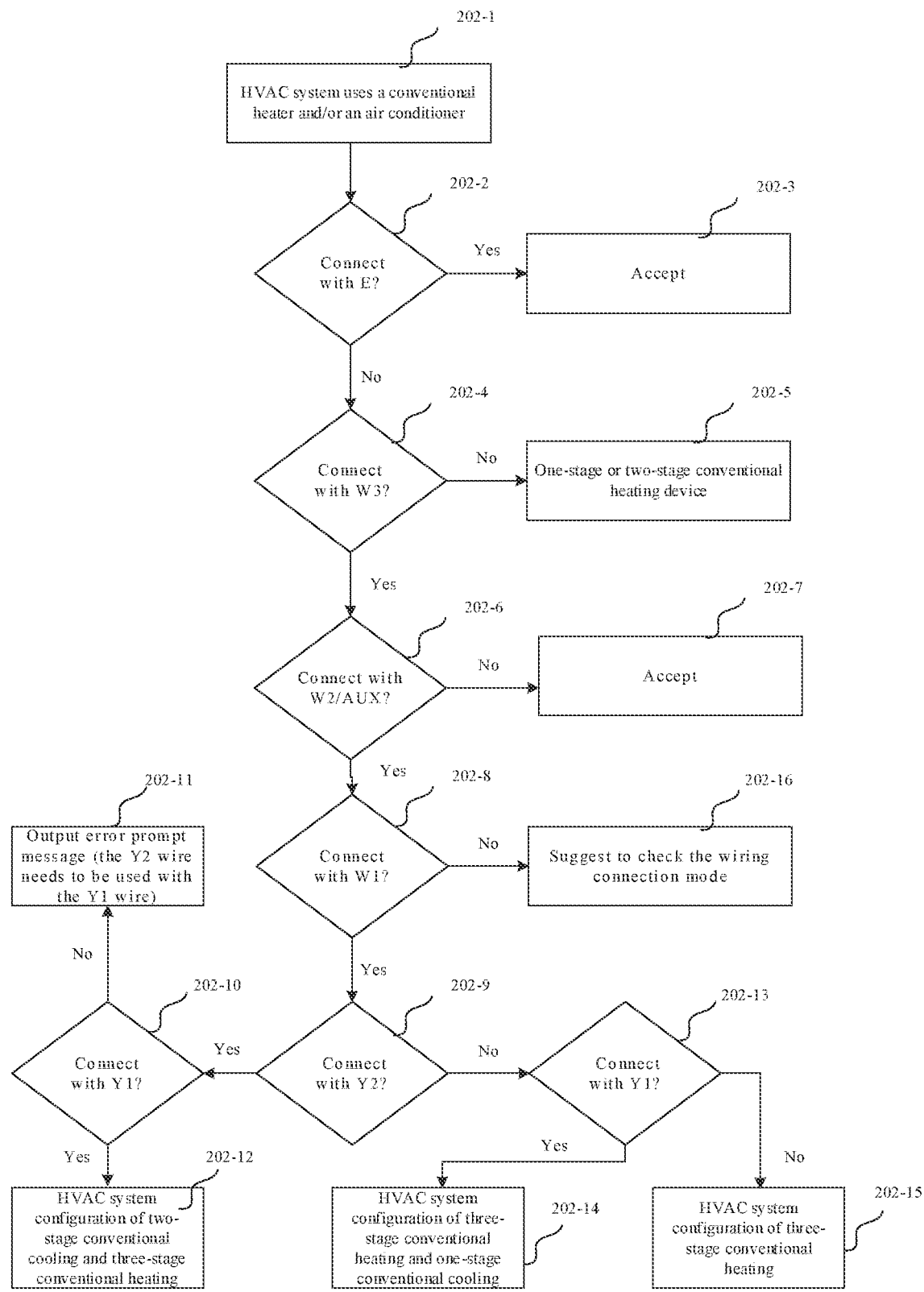
FIG. 2B is a flow diagram of a method of determining a system configuration for a conventional HVAC system by setting first query messages according to an exemplary embodiment of the present disclosure.

For step 202, the configuration of the first query message can be continued. FIG. 2B is a flow diagram of a method of determining a system configuration for a conventional HVAC system through setting first query messages according to an exemplary embodiment of the present disclosure. As shown in FIG. 2B, assuming that the HVAC system uses a conventional heater and/or an air conditioner (202-1), it is asked whether the HVAC system is connected to the E connection terminal of the first thermostat (202-2). If the response to 202-2 is "Yes", an error prompt message is displayed on the display, prompting the user that only when the O/B wire is connected in the heat pump system the E wire is needed to be connected, where the error prompt message can be Accept (202-3). If the response to 202-2 is "No", then continue to ask whether the HVAC system is connected to W3 connection terminal of the first thermostat (202-4). If the response to 202-4 is "No", then the first wiring connection mode may be determined, and in response to knowing the first wiring mode, it can be determined that the system configuration of the HVAC system is a one-stage or two-stage conventional heating device (202-5). If the response to 202-4 is "Yes", then it may be asked whether the HVAC system is connected to the W2/AUX connection terminal of the first thermostat (202-6). If the response to 202-6 is "No", an error prompt message can be output on the display to indicate that the W2/AUX wire is also required if the W3 wire is required, where the error prompt message can be Accept (202-7).

Next, it can be asked whether the HVAC system is connected to W1 connection terminal of the first thermostat (202-8). If the response to 202-8 is "No", a suggestion to check the wiring connection mode is output on the display (202-16), to prompt the user to double check the connections, as the W2/AUX wire needs to be used with the W1 wire. If the response to 202-8 is "Yes", then it may be asked whether the HVAC system is connected to the Y2 connection terminal of the first thermostat (202-9), and whether the HVAC system is connected to the Y1 connection terminal of the first thermostat (202-10). If it can be determined from the responses to 202-9 and 202-10 that the Y2 wire is connected but the Y1 wire is not connected, an error prompt message will be output on the display to remind the user that the Y2 wire needs to be used with the Y1 wire (202-11). If it can be determined from the responses to 202-9 and 202-10 that both the Y1 wire and the Y2 wire are connected to the HVAC system, then it can be determined that the first wiring connection mode is W3, W2/AUX, Y2 and Y1, that is, the HVAC system configuration is two-stage conventional cooling and three-stage conventional heating (202-12). If it can be determined from the responses to 202-9 and 202-13 that there is no Y2 wire when the Y1 wire is connected, then it can be determined that the first wiring connection mode is W3, W2/AUX and Y1, that is, the HVAC system configuration is three-stage conventional heating and one-stage conventional cooling (202-14). If it can be determined from the user's responses to 202-9 and 202-13 that neither the Y1 wire nor the Y2 wire is connected, then it can be determined that the first wiring connection mode is W3 and W2/AUX, that is, the HVAC system configuration is three-stage conventional heating (202-15).

It can be seen from FIG. 2A and FIG. 2B that in some embodiments of the present disclosure, when the user's response to the first query message does not conform to the basic logic, but there is no security risk, an error is not directly prompted, instead, the user's response that does not conform to the basic logic can be "Accept". Then the first wiring connection mode is obtained through other means, which is more conform to the humanized design and improves the success rate of the user installing the thermostat by himself/herself.

Generate multiple judgment logics similar to those shown in FIGS. 2A and 2B based on basic knowledge, display the predetermined first query message on the display screen, and continue to output the next first query message according to the user's response to the first query message, until all the first query messages with the logical relationship are displayed, and the first wiring connection mode between the HVAC system and the first thermostat is determined according to the user's responses to all or part of the first query messages.

As an example, taking FIG. 2A as an example, "Is the HVAC system connected to the O/B connection terminal?" can be displayed on the display screen. If a selection "Yes" is detected, it can continue to display "Is the HVAC system connected to the Y1 connection terminal?" on the display screen". If a selection "No" is detected, it can be displayed on the display screen "The Y1 wire would be necessary if the heat pump works, please check carefully". If the selection "Yes" is detected, continue to display "Is the HVAC system connected to the W3 connection terminal?" on the display. Through the user's responses to the queries about the wiring connection, the first wiring connection mode can be determined, and then the system configuration of the HVAC system can be determined.

In some embodiments, acquiring the first wiring connection mode between the HVAC system and the first thermostat includes: displaying, on the display screen, identifiers corresponding to connection terminals of the first thermostat, and displaying a first prompt message for selecting identifiers, the first prompt message for selecting identifiers is used to instruct the user to select connection terminals of the first thermostat connected to wires of the HVAC system;

after obtaining target identifiers selected by the user from the identifiers, a first wiring connection mode between the HVAC system and the first thermostat is determined according to the target identifiers.

Figure 3:
FIG. 3 is a schematic diagram for displaying identifiers on a display screen according to an exemplary embodiment of the present disclosure.

FIG. 3 is a schematic diagram for displaying identifiers on a display screen according to an exemplary embodiment of the present disclosure. According to the first prompt message, on the display screen as shown in FIG. 3, the user selects identifiers corresponding to connection terminals of the first thermostat where wires of the HVAC system are inserted, and the target identifiers selected by the user from the identifiers displayed on the display screen are obtained. According to the selected target identifiers, the first wiring connection mode between the HVAC system and the first thermostat is determined. For example, the target identifiers selected by the user may be 0/B, Y1, W3, W1, W2/AUX, that is, the HVAC system is connected to the first thermostat through O/B, Y1, W3, W1, W2/AUX.

In some cases, a system configuration may be determined according to the user's response. In other cases, a plurality of possible system configurations may be determined according to the user's response, and subsequently a system configuration may be determined from the plurality of possible system configurations according to other query messages. For example, the type of energy that drives the operation of the HVAC system can be determined through the predetermined second query messages.

In some embodiments, the user response may be parsed through a predetermined programming language, and a reasonable guess can be made based on basic knowledge to determine the system configuration of the HVAC system. For example, when it is detected that the target identifiers selected by the user includes "Y1, Rc, and W2/AUX", it can be inferred that the first wiring connection mode also includes a wire connected to W1 connection terminal, so that according to "Y1, Rc, W2/AUX and W1", the system configuration of the HVAC system is determined.

In some embodiments, acquiring the first wiring connection mode between the HVAC system and the first thermostat includes: displaying a second prompt message on the display screen, where the second prompt message is used to instruct the user to take a wiring image in which a wiring connection between the HVAC system and the first thermostat; acquiring the wiring image; determining a first wiring connection mode between the HVAC system and the first thermostat according to the wiring image.

Where, the wiring image may be an image including wires of the HVAC system connected to the connection terminals of the first thermostat. The wiring image may be captured by a terminal device, or captured by other equipment, for example, may be captured by a device with a higher resolution than the terminal device. When the wiring image is obtained, it can be determined whether the wiring image meets the predetermined requirements, that is, whether contact points between wires and connection terminals can be accurately detected in the wiring image. If it cannot be detected, the user is prompted to take the wiring image again.

In some embodiments, the above three methods of acquiring the first wiring connection mode may be combined, that is, if the first wiring connection mode cannot be determined through the first query messages, the first wiring connection mode may be determined by selecting target identifiers. If the first wiring connection mode cannot be determined by selecting target identifiers, the first wiring connection mode can be determined by taking a wiring image. In this embodiment, the user can choose an acceptable manner by skipping other manners. For example, in the process of determining the first wiring connection mode through the first query messages, the user can skip a first query message by selecting "Next". When the first wiring connection mode is determined, the system configuration of the HVAC system can be determined according to the first wiring connection mode. For example, assuming that the first wiring connection mode is O/B, Y1, W3, W1, W2/AUX, then the system configuration of the HVAC system can be: one-stage heat pump heating and cooling with three-stage conventional heating, or one-stage heat pump heating and cooling with three-stage electrical heating.

Assuming that the first wiring connection mode is O/B, Y1, W3, W1, W2/AUX, Y2, the system configuration of the HVAC system can be: two-stage heat pump heating and cooling, three-stage conventional heating; or two-stage heat pump heating and cooling, with three-stage electrical heater heating.

Assuming that the first wiring mode is O/B, Y1, W3, W1, the system configuration of the HVAC system can be: one-stage heat pump heating and cooling, with two-stage electrical strip heating.

Assuming that the first wiring mode is O/B, Y1, W3, W1, Y2, the system configuration of the HVAC system can be: two-stage heat pump heating and cooling, with two-stage electric heater heating.

Assuming that the first wiring mode is O/B, Y1, W3, W2/AUX, the system configuration of the HVAC system can be: one-stage heat pump heating and cooling, and two-stage conventional heating.

Assuming that the first wiring mode is O/B, Y1, W3, W2/AUX, Y2, the system configuration of the HVAC system can be: two-stage heat pump heating and cooling, and two-stage conventional heating.

In some embodiments, the second wiring connection mode is used to instruct the wires of the HVAC system are inserted into the connection terminals of the second thermostat; outputting the second wiring connection mode on the display screen includes: displaying a third prompt message on the display screen, the third prompt message is used to instruct to reinsert the wires, which had been inserted into the connection terminals of the first thermostat, into the connection terminals of the second thermostat.

In some embodiments, due to lack of professional knowledge, the user may fail to make a correct response to reflect the actual situation of the first wiring connection mode even under the guide of the query messages.

For example, the HVAC system is a dual power supply HVAC system actually. In this dual power supply HVAC system, the Rc wire and the Rh wire are inserted into the Rc connection terminal and the Rh connection terminal of the thermostat respectively, to make sure power supplying is normal. However, when the user answered the query message "Is there a wire connected to the Rh connection terminal?", the user answered no, which caused the application program to give a wrong result for the first wiring connection mode inconsistent with the actual situation, specifically, to incorrectly determine that the HVAC system is a single power supply HVAC system. Based on the single power supply HVAC system, the second wiring connection mode is determined incorrectly.

For another example, the HVAC system is actually a single power supply HVAC system. In this single power supply HVAC system, just when the Rc wire is inserted into the Rc connection terminal of the thermostat, normal power supply of the system can be achieved. However, when the user answered the query message "Is there a wire connected to the Rh connection terminal?", the answer was yes, which caused the application program to give a wrong result for the first wiring connection mode inconsistent with the actual situation, specifically, to wrongly determine that the HVAC system as a dual power supply system. The second wiring connection mode is erroneously determined based on a dual power supply HVAC system.

The second wiring connection mode determined in the case similar to the above two cases fails to reflect the actual situation, which may cause the HVAC system cannot operate normally. Therefore, in the present disclosure, in the constant temperature system, the configured hardware voltage and the state of the equipment may also be detected before the HVAC system starts to work.

In some embodiments, after the second thermostat is connected in the second wiring connection mode, before the HVAC system starts to work, the second thermostat determines whether the HVAC system is dual power supply system by detecting whether a wire is inserted in to the Rh connection terminal, and then the second thermostat decides whether to connect the Rc connection terminal with the Rh connection terminal. In this way, ensure the normal operation of the HVAC system can be ensured.

Specifically, in response to the second thermostat detecting that a wire is inserted into the Rh connection terminal, the second thermostat determines that the HVAC system may actually be a dual power supply HVAC system, and disconnects the Rc connection terminal and the Rh connection terminal. In this way, an occurrence can be avoided that the short circuit of the HVAC system control board caused by the wrong connection between the Rc connection terminal and the Rh connection terminal of the second thermostat, resulting in the occurrence of the fuse burning. In this case, the control signals of the cooling, fan, heat pump, and humidification/dehumidification functions are powered through the Rc connection terminal, and the control signal of the heating function is powered through the Rh connection terminal. In some embodiments, each wire in the HVAC system has a radio frequency tag. The second thermostat includes a radio frequency identifier, and the radio frequency identifier can detect whether the wire connected to the Rh connection terminal is an Rh wire. Dual power supply HVAC system includes an Rh wire, single power supply HVAC system does not include an Rh wire.

In an example, the HVAC system is actually a dual power supply HVAC system, but is erroneously determined to be wiring connected as a single power supply HVAC system. In a single supply HVAC system, when the Rh connection terminal and the Rc connection terminal of the second thermostat are connected, and Rc wire is inserted into the Rc connection terminal of the second thermostat, the single power supply HVAC system can obtain power normally. In this example, the HVAC system is actually a dual power supply HVAC system. A possible situation is that after the HVAC system is connected to the second thermostat according to the second wiring connection mode (wrongly determined based on the single power supply HVAC system), the user finds that a wire (Rh wire) is not connected, and no wire is inserted into the Rh connection terminal of the second thermostat, so the user inserts this wire (the Rh wire) into the Rh connection terminal. In this case, if the second thermostat does not disconnect the Rh connection terminal and the Rc connection terminal in time before operation, the HVAC system, which is actually a dual supply HVAC system, may short circuit and fail to operate normally.

Specifically, in response to the second thermostat detecting that no wire is inserted into Rh connection terminal, a message (such as a voice message) may be issued to prompt the user to check whether the Rh wire of the HVAC system has been forgotten to be inserted. In response to determining that the message has been issued for a predetermined duration (such as 30 s), the second thermostat detects again whether no wire is inserted into the Rh connection terminal. In response to the second thermostat detecting again that there is no wire connected to the Rh connection terminal, it is determined that the HVAC system is actually a single power supply HVAC system and connect the Rc connection terminal to the Rh connection terminal, to ensure that all functions of the HVAC system can operate normally. At this time, the control signals of all HVAC functions such as heating, cooling, fan, heat pump, and humidification/dehumidification are powered through the Rc connection terminal.

In an example, the HVAC system is actually a single supply system, but is determined to be wiring connected as a dual supply system. In a dual power supply system, when the Rh connection terminal and the Re connection terminal of the second thermostat are kept disconnected, and the Rh wire and the Rc wire are inserted into the Rh connection terminal and Rc connection terminal of the second thermostat through respectively, the HVAC system of a dual power supply system can obtain power supply normally. In this example, the HVAC system is actually a single power supply system. A possible situation is that when the user performs wiring connection according to the second wiring connection mode (wrongly determined based on the dual power supply system), he or she finds that there is no Rh wire in the HVAC system. In this case, it may be time-consuming to check what causes of the error one by one. The second thermostat can directly issue a voice message to remind the user whether the Rh wire of the HVAC system has been missed. After the voice message is issued for a predetermined duration, the second thermostat checks again whether a wire is inserted into the Rh connection terminal. If it is detected again that there is no wire connected to the Rh connection terminal, it is determined that the HVAC system is actually a single power supply HVAC system and the Rc connection terminal is connected with the Rh connection terminal. If the Rh connection terminal and the Rc connection terminal are not connected in time before the operation of the HVAC system, some functions of the HVAC system of the single power supply system, such as the heating function, cannot obtain power supply normally, and thus the HVAC system cannot operate normally.

In some scenarios, such as when replacing an old thermostat with a new thermostat, the user is generally instructed to record a connection of each wire to the old thermostat and then make the same connection to the corresponding connection terminal on the new thermostat. In other scenarios, the identifiers corresponding to the connection terminals on the new thermostat and the old thermostat are not identical. In this case, in this embodiment, in response to that the first wiring connection mode is known, the first wiring connection mode is converted to the second wiring connection mode by the basic knowledge in the field, and a third prompt message is displayed on the display screen to prompt the user to reinserted the wires originally connected to the connection terminal of the old thermostat into the connection terminals of the new thermostat according to the third prompt message.

In general, when replacing the thermostat, the old thermostat connected to the HVAC system is first removed, and then the new thermostat is connected to the HVAC system. Although the HVAC system distinguishes different wires by different colors, when a user faces multiple wires, it is not easy for the user to remember the function of each wire. Therefore, in the embodiment, the user can be prompt to put a label on a wire, where the label can be made by the user or can be included with a new thermostat.

Figure 4:
FIG. 4 is a schematic diagram for displaying labeling on a display screen according to an exemplary embodiment of the present disclosure.

FIG. 4 is a schematic diagram for displaying labels on a display screen according to an exemplary embodiment of the present disclosure. As shown in FIG. 4, the user can be prompted to label the following 5 wires on the display: Rh→Rc, W2→W1, Y1→Y1, C→C, G→G. In other words, the user can insert the wire into the corresponding connection terminal according to the label on the wire.

In some embodiments, determining the type of energy source that drives the operation of the HVAC system includes: displaying, on the display screen, at least one predetermined second query message associated with the second wiring connection mode; according to a response to the second query message, the type of energy source for operation of the HVAC system is determined.

A plurality of second query messages matching the second wiring connection mode is set in advance according to the basic knowledge in the field. For example, FIG. 5A, FIG. 5B, FIG. 5C and FIG. 5D respectively show different second query messages and options for the user to select. The type of energy source that drives the HVAC system can be determined based on the user's selections, i.e., the user's responses.

Figure 5A:
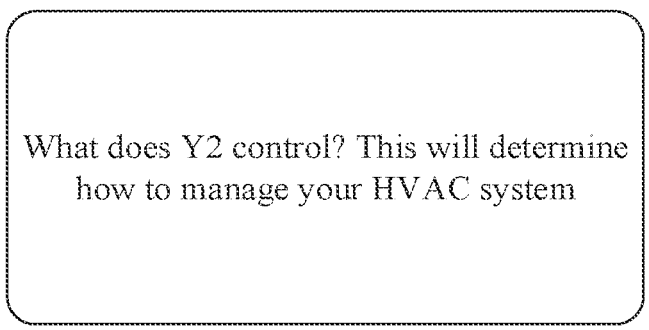
FIG. 5A is a schematic diagram for a second query message according to an exemplary embodiment of the present disclosure.

FIG. 5A is a schematic diagram for a second query message according to an exemplary embodiment of the present disclosure. As shown in FIG. 5A, the second query message displayed on the display screen may be "What does Y2 control? This will determine how to manage your HVAC system", the user can choose "Heat pump, Chiller, or Other". In the embodiment of the present disclosure, the user is allowed to choose "Other". If the user selects "Oher", jump to the next page. In the next page, another way can be shown, for example, another set of second query messages, to determine the type of energy source that drives the operation of the HVAC system.

Figure 5B:
FIG. 5B is a schematic diagram for another second query message according to an exemplary embodiment of the present disclosure.

FIG. 5B is a schematic diagram for another second query message according to an exemplary embodiment of the present disclosure. As shown in FIG. 5B, the second query message displayed on the display screen may be "Which type of heat pump does Y2 control?" The user can choose "Heat only, Cool only, Heat and cool, or I don't know". As shown in FIG. 5B, in the embodiment of the present disclosure, the type of energy source that drives the operation of the HVAC system can be determined through the function of the HVAC system.

Figure 5C:
FIG. 5C is a schematic diagram for still another second query message according to an exemplary embodiment of the present disclosure.

FIG. 5C is a schematic diagram for still another second query message according to an exemplary embodiment of the present disclosure. As shown in FIG. 5C, the second query message displayed on the display screen may be "What type of fuel is used?" The user can choose "Electricity, Gas, Oil, Propane, or I don't know".

Figure 5D:
FIG. 5D is a schematic diagram for still another second query message according to an exemplary embodiment of the present disclosure.

FIG. 5D is a schematic diagram for still another second query message according to an exemplary embodiment of the present disclosure. As shown in FIG. 5D, the second query message displayed on the display screen may be "What is heating method for W1?" The user can choose "Hot air, Radiator, Radiant heating, or Other".

In some embodiments, acquiring the control logic matching the system configuration and the type of energy source includes: sending the system configuration and the type of energy source to a cloud server communicatively coupled to the terminal device, the cloud server is configured to provide the terminal device with control logic matching the system configuration and the type of energy source; acquiring the control logic matching the system configuration and the type of energy source provided by the cloud server.

Storing the control logic that matches the system configuration and the type of energy source on the cloud server can reduce the requirements for the thermostat hardware, that is, the cost of the thermostat can be reduced. The terminal device sends the system configuration and the type of energy source determined through the above steps to the cloud server. The cloud server, after receiving the system configuration and the type of energy source sent by the terminal device, searches for the control logic matching the system configuration and the type of energy source from the stored control logic, and sends the control logic to the terminal device. The terminal device acquires the control logic provided by the cloud server that matches the system configuration and the type of energy source, and sends the control logic to the thermostat. Power supply prompt message is displayed on the display screen, to prompt the user to supply power to the thermostat. In some embodiments, the system configuration and the type of energy source can be converted into a device code according to predetermined rules. The device code is sent to the cloud server. The cloud server searches for matching control logic according to the device code. Since the device code is generated according to the system configuration and the type of energy source, multiple users can use the same set of control logic.

The control logic is stored in the cloud server, and the control logic can be upgraded at any time, which can correspondingly improve the user experience.

It should be understood that the second thermostat may include more or fewer HVAC wires than the first thermostat, which may have different names or labels associated with the HVAC wires. Different logic algorithms may be used to determine the control logic for controlling the HVAC system, according to the available wires and the connection terminals used for a particular thermostat.

At least one embodiment of the present disclosure provides a device. The device includes a memory, a processor, and a display, the memory is configured to store computer instructions executable on the processor, the processor is configured to implementing steps described in any embodiment of the present disclosure when the computer instructions are executed.

At least one embodiment of the present disclosure further provides a computer non-transitory readable storage medium on which a computer program is stored, and when the program is executed by a processor, steps described in any embodiment of the present disclosure are implemented.

As will be understood by the skilled in the art, one or more embodiments of this specification may be provided as a method, system or computer program product. Accordingly, one or more embodiments of this specification may take the form of an entirely hardware embodiment, an entirely software embodiment, or an embodiment combining software and hardware aspects. Furthermore, one or more embodiments of the present specification may employ the form of a computer program product implemented on one or more computer-usable storage media (including, but not limited to, disk storage, CD-ROM, optical storage, etc.), where the one or more computer-usable storage media having computer-usable program code.

"And/or" in this specification means at least one of the two, for example, "A and/or B" includes three schemes: A, B, and "A and B".

The various embodiments in this specification are described in a progressive manner, and the same or similar parts between the various embodiments may be referred to each other, and each embodiment focuses on the differences from other embodiments. In particular, for the data processing apparatus embodiment, since it is basically similar to the method embodiment, the description is relatively simple, and for related parts, please refer to the partial description of the method embodiment.

The foregoing describes specific embodiments of the present specification. Other embodiments are within the scope of the appended claims. In some cases, the acts or steps recited in the claims can be performed in an order different from that in the embodiments and still achieve desirable results. Additionally, the processes depicted in the figures do not necessarily require the shown particular order or sequential order, to achieve desirable results. In some embodiments, multitasking and parallel processing are also possible or may be advantageous.

Embodiments of the subject matter and functional operations described in this specification can be implemented in digital electronic circuitry, tangible computer software or firmware, computer hardware including the structures disclosed in this specification and their structural equivalents, or a combination of one or more thereof. Embodiments of the subject matter described in this specification may be implemented as one or more computer programs, i.e., one or more of modules in computer program instructions encoded on a tangible, non-transitory program carrier to be executed by a data processing apparatus, or to control the operation of the data processing apparatus. Alternatively or additionally, the program instructions may be encoded on an artificially generated propagating signal, such as a machine-generated electrical, optical or electromagnetic signal, which is generated to encode and transmit information to a suitable receiver device to be executed by the data processing device. The computer storage medium may be a machine-readable storage device, a machine-readable storage substrate, a random or serial access memory device, or a combination of one or more thereof.

The processes and logic flows described in this specification can be performed by one or more programmable computers executing one or more computer programs to perform corresponding functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, for example, general and/or special purpose microprocessors, or any other type of central processing unit. Typically, the central processing unit will receive instructions and data from read only memory and/or random access memory. The basic components of a computer include a central processing unit for implementing or executing instructions and one or more memory devices for storing instructions and data. Typically, a computer also includes one or more high-capacity storage devices for storing data, such as magnetic, magneto-optical or optical disks, or a computer is operably coupled to the high-capacity storage devices to receive data therefrom or transfer data thereto, or both. However, the computer does not have to have such a device. Furthermore, the computer may be embedded in another device such as a mobile phone, personal digital assistant (PDA), mobile audio or video player, game console, global positioning system (GPS) receiver, or a portable storage device (such as a universal serial bus (USB) flash drive), only a few examples are named here.

Computer readable media suitable for storage of computer program instructions and data include all forms of non-volatile memory, media, and memory devices, including, for example, semiconductor memory devices (e.g., EPROM, EEPROM, and flash memory devices), magnetic disks (e.g., internal hard disks or removable discs), magneto-optical discs, and CD-ROM and DVD-ROM discs. The processor and memory may be supplemented by or incorporated in special purpose logic circuitry.

While this specification contains many specific implementation details, these should not be understood as limiting the scope of any invention or what may be claimed, but are used primarily to describe features of specific embodiments of particular inventions. Certain features that are described in this specification in multiple embodiments can also be implemented in combination in a single embodiment. On the other hand, various features that are described in the context of a single embodiment can also be implemented in multiple embodiments separately or in any suitable subcombination. Furthermore, although features may function as described above in certain combinations and even be originally claimed as such, one or more features from a claimed combination may in some cases be removed from the combination and the claimed protected combination may point to a subcombination or a variation of a subcombination.

Similarly, although operations in the figures are depicted in a particular order, this should not be construed as requiring that the operations be performed in the particular order shown or sequentially, or that all illustrated operations be performed, to achieve the desired result. In some cases, multitasking and parallel processing may be advantageous. Furthermore, the separation of the various system modules and components in the above-described embodiments should not be construed as requiring such separation in all embodiments, and it should be understood that the described program components and systems may generally be integrated together in a single software product, or packaged into multiple software products.

Thus, specific embodiments of the subject matter have been described. Other embodiments are within the scope of the appended claims. In some cases, the actions recited in the claims can be performed in a different order and still achieve desirable results. Furthermore, the processes depicted in the figures do not necessarily require the particular order shown, or sequential order, to achieve desirable results. In some implementations, multitasking and parallel processing may be advantageous.

The above descriptions are only preferred embodiments of one or more embodiments of this specification, and are not intended to limit one or more embodiments of this specification. Any modifications, equivalent replacements, improvements, etc. made within the spirit and principles of one or more embodiments of this specification should be included within the protection scope of one or more embodiments of this specification.

What is claimed is:

1. A constant temperature system, comprising:
 a second thermostat for replacing a first thermostat configured to control a heating, ventilation, and air conditioning (HVAC) system; and
 a terminal device having an application program for guiding installation of the second thermostat, wherein the terminal device includes a display screen, and the application program is configured to:

obtain a first wiring connection mode between the HVAC system and the first thermostat, and determine a system configuration of the HVAC system according to the first wiring connection mode;

determine a second wiring connection mode between the second thermostat and the HVAC system according to the system configuration, and output the second wiring connection mode on the display screen;

determine a type of an energy source for driving the HVAC system to operate; and obtain control logic matching the system configuration and the type of the energy source to enable the second thermostat to control the HVAC system according to the control logic, wherein the second thermostat and the HVAC system are connected in the second wiring connection mode;

wherein after the second thermostat is connected in the second wiring connection mode and before the HVAC system starts to operate, the second thermostat is further configured to check a wiring connection state of the second thermostat;

wherein the second thermostat is configured to:
 detect whether a wire is inserted into Rh connection terminal of the second thermostat, to determine whether the HVAC system is a single power supply HVAC system;
 in response to detecting that a wire is inserted into Rh connection terminal of the second thermostat, disconnect Rc connection terminal and Rh connection terminal of the second thermostat; and
 in response to detecting that no wire is inserted into Rh connection terminal of the second thermostat,
 issue a message to prompt a user to check whether a Rh wire of the HVAC system has forgotten to be inserted,
 in response to determining that the message has been sent for a predetermined time period, detect again whether a wire is inserted into the Rh connection terminal,
 in response to detecting again that there is no wire inserted into the Rh connection terminal, determine that the HVAC system is a single power supply HVAC system, and
 connect the Re connection terminal to the Rh connection terminal.

2. The system according to claim 1, wherein the terminal device is configured to obtain the first wiring connection mode between the HVAC system and the first thermostat by:
 displaying, on the display screen, at least one predetermined first query message associated with the first wiring connection mode; and
 based on a response to the first query message, determining the first wiring connection mode between the HVAC system and the first thermostat.

3. The system according to claim 1, wherein the terminal device is configured to obtain the first wiring connection mode between the HVAC system and the first thermostat by:
 displaying, on the display screen, identifiers corresponding to connection terminals of the first thermostat and a first prompt message, wherein the first prompt message is configured to instruct the user to select connection terminals of the first thermostat connected to wires of the HVAC system; and
 in response to acquiring target identifiers selected by the user from the identifiers, determining the first wiring connection mode between the HVAC system and the first thermostat according to the target identifiers.

4. The system according to claim 1, wherein the terminal device is configured to obtain the first wiring connection mode between the HVAC system and the first thermostat by:
 displaying, on the display screen, a second prompt message, wherein the second prompt message is configured to instruct the user to take a wiring image in which a connection between the HVAC system and the first thermostat;
 obtaining the wiring image; and
 determining the first wiring connection mode between the HVAC system and the first thermostat according to the wiring image.

5. The system according to claim 1, wherein the terminal device is configured to output, on the display screen, the second wiring connection mode by:
 displaying, on the display screen, a third prompt message, wherein the third prompt message is configured to instruct to reinsert wires that had been inserted into connection terminals of the first thermostat into connection terminals of the second thermostat.

6. The system according to claim 1, wherein the terminal device is configured to determine the type of the energy source for driving the HVAC system to operate by:
 displaying, on the display screen, at least one predetermined second query message associated with the second wiring connection mode; and
 determining, based on a response to the at least one second query message, the type of the energy source for driving the HVAC system to operate.

7. The system according to claim 1, wherein the terminal device is configured to obtain the control logic matching the system configuration and the type of the energy source by:
 sending the system configuration and the type of the energy source to a cloud server communicatively coupled to the terminal device, wherein the cloud server is configured to provide the terminal device with the control logic matching the system configuration and the type of the energy source; and
 obtaining the control logic provided by the cloud server matching the system configuration and the type of the energy source.

8. The system according to claim 1, wherein, in response to detecting that a wire is inserted into Rh connection terminal of the second thermostat, the second thermostat is configured to disconnect the Re connection terminal and the Rh connection terminal of the second thermostat by:
 determining whether the wire inserted into the Rh connection terminal is an Rh wire; and
 in response to determining that the wire connected to the Rh connection terminal is an Rh wire, determining that the HVAC system is a dual power supply HVAC system, and disconnecting the Rc connection terminal and the Rh connection terminal of the second thermostat.

9. A device, applied to a constant temperature system comprising: a second thermostat for replacing a first thermostat; the device comprising:
 a storage medium storing processor executable instructions;
 a processor configured to execute the processor executable instructions;
 a display screen;
 while executing the processor executable instructions, the processor performs following operations:
  obtain a first wiring connection mode between an HVAC system and the first thermostat, and determine a system configuration of the HVAC system according to the first wiring connection mode;
determine a second wiring connection mode between the second thermostat and the HVAC system according to the system configuration, and output the second wiring connection mode on the display screen;
determine a type of an energy source for driving the HVAC system to operate; and
obtain control logic matching the system configuration and the type of the energy source to enable the second thermostat to control the HVAC system according to the control logic, wherein the second thermostat and the HVAC system are connected in the second wiring connection mode;
wherein after the second thermostat is connected in the second wiring connection mode and before the HVAC system starts to operate, the second thermostat is further configured to check a wiring connection state of the second thermostat;
wherein the second thermostat is configured to:
detect whether a wire is inserted into Rh connection terminal of the second thermostat, to determine whether the HVAC system is a single power supply HVAC system;
in response to detecting that a wire is inserted into Rh connection terminal of the second thermostat, disconnect Rc connection terminal and Rh connection terminal of the second thermostat; and
in response to detecting that no wire is inserted into Rh connection terminal of the second thermostat,
issue a message to prompt a user to check whether a Rh wire of the HVAC system has forgotten to be inserted,
in response to determining that the message has been sent for a predetermined time period, detect again whether a wire is inserted into the Rh connection terminal,
in response to detecting again that there is no wire inserted into the Rh connection terminal, determine that the HVAC system is a single power supply HVAC system, and
connect the Re connection terminal to the Rh connection terminal.

10. The device according to claim 9, wherein the processor obtains the first wiring connection mode between the HVAC system and the first thermostat by:
displaying, on the display screen, at least one predetermined first query message associated with the first wiring connection mode; and
based on a response to the first query message, determining the first wiring connection mode between the HVAC system and the first thermostat.

11. The device according to claim 9, wherein the processor obtains the first wiring connection mode between the HVAC system and the first thermostat by:
displaying, on the display screen, identifiers corresponding to connection terminals of the first thermostat and a first prompt message, wherein the first prompt message is configured to instruct the user to select connection terminals of the first thermostat connected to wires of the HVAC system; and
in response to acquiring target identifiers selected by the user from the identifiers, determining the first wiring connection mode between the HVAC system and the first thermostat according to the target identifiers.

12. The device according to claim 9, wherein the processor obtains the first wiring connection mode between the HVAC system and the first thermostat by:
displaying, on the display screen, a second prompt message, wherein the second prompt message is configured to instruct the user to take a wiring image in which a connection between the HVAC system and the first thermostat;
obtaining the wiring image; and
determining the first wiring connection mode between the HVAC system and the first thermostat according to the wiring image.

13. The device according to claim 9, wherein the processor outputs, on the display screen, the second wiring connection mode by:
displaying, on the display screen, a third prompt message, wherein the third prompt message is configured to instruct to reinsert wires that had been inserted into connection terminals of the first thermostat into connection terminals of the second thermostat.

14. The device according to claim 9, wherein the processor determines the type of the energy source for driving the HVAC system to operate by:
displaying, on the display screen, at least one predetermined second query message associated with the second wiring connection mode; and
determining, based on a response to the at least one second query message, the type of the energy source for driving the HVAC system to operate.

15. The device according to claim 9, wherein the processor obtains the control logic matching the system configuration and the type of the energy source by:
sending the system configuration and the type of the energy source to a cloud server communicatively coupled to a terminal device, wherein the cloud server is configured to provide the terminal device with the control logic matching the system configuration and the type of the energy source; and
obtaining the control logic provided by the cloud server matching the system configuration and the type of the energy source.

16. A non-transitory storage medium having processor executable instructions stored thereon and applied to a constant temperature system, wherein the constant temperature system includes: a heating, ventilation and air conditioning (HVAC) system; a first thermostat; and a second thermostat for replacing the first thermostat;
when executing the processor executable instructions, the processor performs following operations:
obtaining a first wiring connection mode between the HVAC system and the first thermostat, and determining a system configuration of the HVAC system according to the first wiring connection mode;
determining a second wiring connection mode between the second thermostat and the HVAC system according to the system configuration, and outputting the second wiring connection mode;
determining a type of an energy source for driving the HVAC system to operate; and
obtaining control logic matching the system configuration and the type of the energy source to enable the second thermostat to control the HVAC system according to the control logic, where the second thermostat and the HVAC system are connected in the second wiring connection mode;
wherein after the second thermostat is connected in the second wiring connection mode and before the HVAC system starts to operate, the second thermostat is further configured to check a wiring connection state of the second thermostat;

wherein the second thermostat is configured to:
- detect whether a wire is inserted into Rh connection terminal of the second thermostat, to determine whether the HVAC system is a single power supply HVAC system;
- in response to detecting that a wire is inserted into Rh connection terminal of the second thermostat, disconnect Rc connection terminal and Rh connection terminal of the second thermostat; and
- in response to detecting that no wire is inserted into Rh connection terminal of the second thermostat,
- issue a message to prompt a user to check whether a Rh wire of the HVAC system has forgotten to be inserted,
- in response to determining that the message has been sent for a predetermined time period, detect again whether a wire is inserted into the Rh connection terminal,
- in response to detecting again that there is no wire inserted into the Rh connection terminal, determine that the HVAC system is a single power supply HVAC system, and
- connect the Rc connection terminal to the Rh connection terminal.

* * * * *